United States Patent
Sinquefield et al.

(10) Patent No.: US 10,633,881 B1
(45) Date of Patent: Apr. 28, 2020

(54) EASY TO ASSEMBLE, ABOVE GROUND EXTREME WEATHER SHELTER

(71) Applicants: Jeanne Cairns Sinquefield, Westphalia, MO (US); Steven G Goldstein, Los Angeles, CA (US)

(72) Inventors: Jeanne Cairns Sinquefield, Westphalia, MO (US); Steven G Goldstein, Los Angeles, CA (US)

(*) Notice: Subject to any disclaimer, the term of this patent is extended or adjusted under 35 U.S.C. 154(b) by 0 days.

(21) Appl. No.: 15/936,379

(22) Filed: Mar. 26, 2018

Related U.S. Application Data

(60) Provisional application No. 62/476,688, filed on Mar. 24, 2017.

(51) Int. Cl.
| | |
|---|---|
| *E04H 9/14* | (2006.01) |
| *E04B 1/12* | (2006.01) |
| *E04B 1/32* | (2006.01) |
| *E04B 1/00* | (2006.01) |

(52) U.S. Cl.
CPC .......... *E04H 9/14* (2013.01); *E04B 1/12* (2013.01); *E04B 1/3211* (2013.01); *E04B 2001/0061* (2013.01); *E04B 2001/3276* (2013.01); *E04B 2103/04* (2013.01)

(58) Field of Classification Search
CPC . E04H 9/14; E04B 1/12; E04B 1/3211; E04B 2001/3276; E04B 2103/04; E04B 2001/0061; E02B 3/108
USPC ....... 52/80.1, 81.1, 81.4, 607, 563, 567, 570
See application file for complete search history.

(56) References Cited

U.S. PATENT DOCUMENTS

| | | | | | |
|---|---|---|---|---|---|
| 2,944,370 | A | * | 7/1960 | Malarkey | E04B 1/3211 220/4.28 |
| 3,257,930 | A | * | 6/1966 | Averna | E04B 1/3211 454/185 |
| 3,660,952 | A | * | 5/1972 | Wilson | E04B 1/10 52/591.2 |
| 4,655,013 | A | * | 4/1987 | Ritland | E04B 1/14 52/127.9 |
| 4,798,032 | A | * | 1/1989 | Rose, Jr. | E04B 1/3211 52/309.9 |
| 4,848,046 | A | * | 7/1989 | Wallhead | E04H 9/16 52/81.4 |
| 5,149,203 | A | * | 9/1992 | Sacks | A45C 3/00 190/125 |
| 5,511,902 | A | * | 4/1996 | Center | E02B 3/108 405/15 |
| 6,059,491 | A | * | 5/2000 | Striefel | E01F 15/086 256/13.1 |

(Continued)

*Primary Examiner* — Theodore V Adamos
(74) *Attorney, Agent, or Firm* — Robert WJ Usher

(57) ABSTRACT

A tornado shelter has a dome-shape, sheltering wall formed by a multiplicity of modular, hollow/cavitied wall panel units manually assembled together at respective peripheral edges by the mating engagement of interlocking, male and female portions. Each wall panel unit is a one-piece molding with opposed side wall portions in spaced apart, parallel relation defining between them respective containers with filler openings adjacent a top and containing a filler material of alternately water, a rheopectic fluid, gel or granular particles, thereby increasing impact strength and anchoring weight. Selected base panel units are formed with respective eyes receiving ground anchoring stakes. Panel portions can be laminates reinforced by wire mesh or KEVLAR integrally molded therein.

10 Claims, 14 Drawing Sheets

(56) References Cited

U.S. PATENT DOCUMENTS

| | | | |
|---|---|---|---|
| 6,151,841 A | 11/2000 | Green | |
| 6,434,896 B1 * | 8/2002 | Mitchell | B29C 41/06 52/169.6 |
| 6,481,166 B2 | 11/2002 | Shelton | |
| 6,588,157 B1 * | 7/2003 | Davies | E04B 1/3211 52/81.1 |
| 7,180,918 B2 | 2/2007 | Shane et al. | |
| 8,429,858 B1 * | 4/2013 | Robinson | E04H 1/005 52/79.5 |
| 8,448,403 B1 * | 5/2013 | Wallace | E04C 1/39 405/284 |
| 8,474,195 B1 * | 7/2013 | Anchondo | E03B 3/03 52/168 |
| 9,013,102 B1 * | 4/2015 | Wedding | H01J 47/12 250/374 |
| 9,021,790 B2 | 5/2015 | Boyd et al. | |
| 2002/0148176 A1 * | 10/2002 | Shelton | E04H 9/14 52/169.1 |
| 2007/0154265 A1 * | 7/2007 | Stauffacher | E02B 3/108 405/110 |
| 2009/0025306 A1 * | 1/2009 | Reed | E04B 1/3211 52/80.1 |
| 2009/0025307 A1 * | 1/2009 | Crichlow | E04B 1/3211 52/81.1 |
| 2009/0165401 A1 * | 7/2009 | Smalley, III | E04B 1/34315 52/91.3 |
| 2010/0215436 A1 * | 8/2010 | Johnson | E02B 3/108 405/110 |
| 2011/0265397 A1 * | 11/2011 | Trochan | E04H 9/14 52/82 |
| 2015/0225976 A1 * | 8/2015 | Carlson | E04H 9/028 52/2.11 |
| 2015/0259942 A1 * | 9/2015 | Crichlow | E04H 9/14 52/79.1 |
| 2018/0051456 A1 * | 2/2018 | Hudlow | E04B 1/161 |

* cited by examiner

EASY TO ASSEMBLE, ABOVE GROUND EXTREME WEATHER SHELTER

RELATED APPLICATION

Priority is claimed from our provisional application Ser. No. 62/476,688 filed Mar. 24, 2017.

FIELD OF INVENTION

This invention relates to easy to assemble extreme weather shelters and, more particularly, to tornado shelters.

BACKGROUND OF THE INVENTION

Tornado shelters are important. "Most death and injuries in tornados result from individuals being struck by flying debris or being killed by being rolled across the ground by the high winds." and "almost all the damage caused by tornadoes can be attributed to wind induced forces tearing structures apart." By John Snow, "Tornado", "Encyclopedia Britannica" 2011.

A conventional tornado shelter of the prior art can be a complicated structure requiring specific/special building materials, and skillful installation to resist impact from flying debris; heavy loading, to prevent collapse and, the capability of resisting both extensive wind shear and lift. Applied cost has several components including the tornado shelter structure itself, delivery to site, and on-site construction and installation. No prior reliable tornado shelter exists that can be easily delivered, and erected by unskilled labor on site at a low cost.

A new, improved type of tornado shelter therefore requires new materials, a different type of structure and simple installation. Conflicting requirements are building materials of relatively light weight for easy delivery, but a heavy structure for strength and stability. The new structure requires a different and corrected perception of the effect of wind on shelters.

Different types of structures are affected differently by wind. Extensive research of the literature suggested a geodesic dome type structure. Practical experience with a large dome in a high wind area (60-70 miles per hour) in Missouri reinforced that conclusion.

Computer wind simulations which included tests of wind shear, wind lift and load properties of various configurations of the geodesic dome tornado shelter using the computer program Solidworks Computational Fluid Dynamics (CFD were reviewed by specialized engineers to determine that the structure could a) handle wind shear of 350 miles per hour b) handle a large load of 20,000 pounds, c) deal with 10,000 pounds of lift and d) handle debris thrown at 100 miles an hour. These meet the requirements for an F4 as set by the FEMA 320 tests.

Most injuries caused during a tornado by wind driven debris either directly impacting a person or a sheltering structure, are caused by large items landing on top of them. Seemingly harmless items such as small rocks or larger items like a wooden two-by-four can become deadly projectiles.

In order to pass the stringent FEMA storm shelter projectile tests, shelters are typically made from dense and weighty materials like concrete and steel. Current, above ground designs are massive and heavy, and often use an obstructive barrier method to withstand the high winds of a tornado and deadly wind driven projectiles. Other shelter options are buried underground, which adds to the complexity of construction, installation, and extraction. Underground shelters also risk developing mold, flooding, or being covered by debris during a storm.

Some, more modern, shelters incorporate more modern composite materials, but in all cases, current shelters are expensive and require third-party, professional installation crews or heavy machinery for installation. Most above ground storm shelters start at about $3,000. As a result of such high cost, most homes in high storm areas do not have a storm shelter in spite of the variety of storm shelters available. Storm shelters are usually considered too expensive by many who would benefit from them but, at the same time, so desirable that a new trend in St Louis, Mo. s for engaged couples to request storm shelter donations as a wedding gift.

Communal storm shelters do exist in some communities, but often people don't seek shelter from a tornado without a direct visual indication of the impending hazard. Even then, if a large group of people try to relocate to a communal shelter at once, the influx of traffic can leave people stranded in their cars in a traffic jam—arguably one of the most dangerous places to be during a tornado. As a result of those risks, personal storm shelters are beneficial and in demand by consumers.

The present invention provides a solution to the above-noted problems by providing storm shelters that are constructed of lightweight, high impact materials and are affordable, easily transportable with a non-commercial vehicle/non-heavy goods vehicle, (such as a pick-up truck of average size), easy to erect, and easy to relocate.

SUMMARY OF THE INVENTION

According to the invention, the requirements of light weight for ease of delivery and erection and heaviness for stability are met by a dome-shape shelter constructed from hollow/cavitied, interlocking, panel building units made of a material impervious to ballast forming liquids such as water or other flowable materials such as soil and forming containers with upper filler openings that can, when erected/assembled together, be filled simply by pouring in the ballast through the upper filler openings. Linear low-density polyethylene (LLDPE) is a preferred impervious material for the building units.

Thus, the empty panels forming the wall building units are light when purchased, but suitably heavy once assembled as the dome and full of ballast. When remaining unset, the flowable property of the ballast facilitates ballast emptying at a later date for shelter relocation. The flowable material may be a granular/particulate solid such as sand or earth, a liquid such as water, a non-newtonian, (possibly rheopectic) liquid or, when redeployment is not foreseen, a gel. Those ballasts also result in an impact absorbing structure. The hemispherical tornado shelter dome is anchored to the ground at multiple points around the diametric periphery. The anchors and the ballast, together ensure that the shelter is sufficiently strong and heavy to withstand tornado strength winds and associated high impacts.

According to another aspect, a kit for forming a tornado shelter comprises a multiplicity of modular, hollow, wall panel units for assembly together by hand at respective peripheral edges to form an imperforate dome—shape sheltering wall and, a door, the hollow, wall panel units providing respective containers formed with filler openings for receiving a flowable, filling ballast material therein when the panels are assembled together, to add impact strength and anchoring weight.

Although modular, wall panel units forming a single dome may be comprise plural series of hexagonal, pentagonal and hemi-hexagonal (trapezoidal) shapes.

Preferably, each panel is a one-piece plastic molding, preferably by roll molded, with respective peripheral edges integrally formed with complementary, interlocking, male and female portions whereby adjacent panels can be hand-assembled together releasably and disassembled, facilitating deployment elsewhere.

It is further preferred that a shelter assembly kit includes means to attach wall anchoring stakes to the assembly, such as eyes formed on selected wall panel units, themselves adapted to provide a ground contacting base of the wall.

Since the tornado shelter dome is not primarily constructed from traditional materials like concrete or steel, and since it does not require professional delivery and installation, the cost of the storm shelter described below is expected to be $1000-$1500.

When particulates such as sand are employed as ballast, a small amount of water may be added to increase the weight by filling all interstices between individual particles and possibly to increase impact resistance as a result of surface tension forces tending to adhere particles together.

DESCRIPTION OF PARTICULAR EMBODIMENTS

Figure 1:
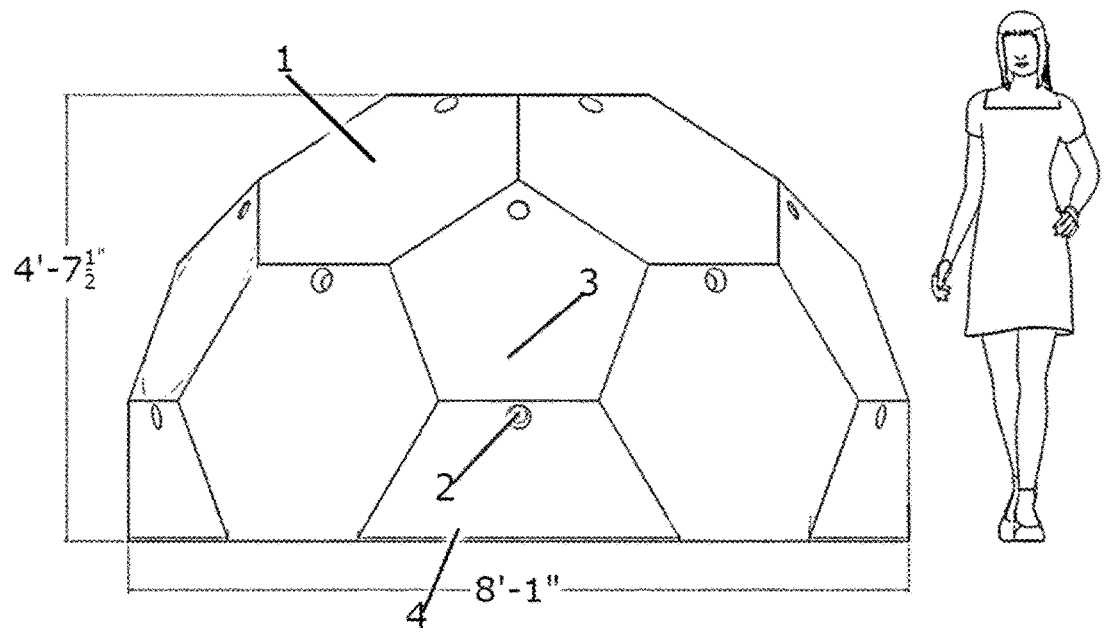
FIG. 1 is a side view of the tornado shelter dome.
Figure 2:
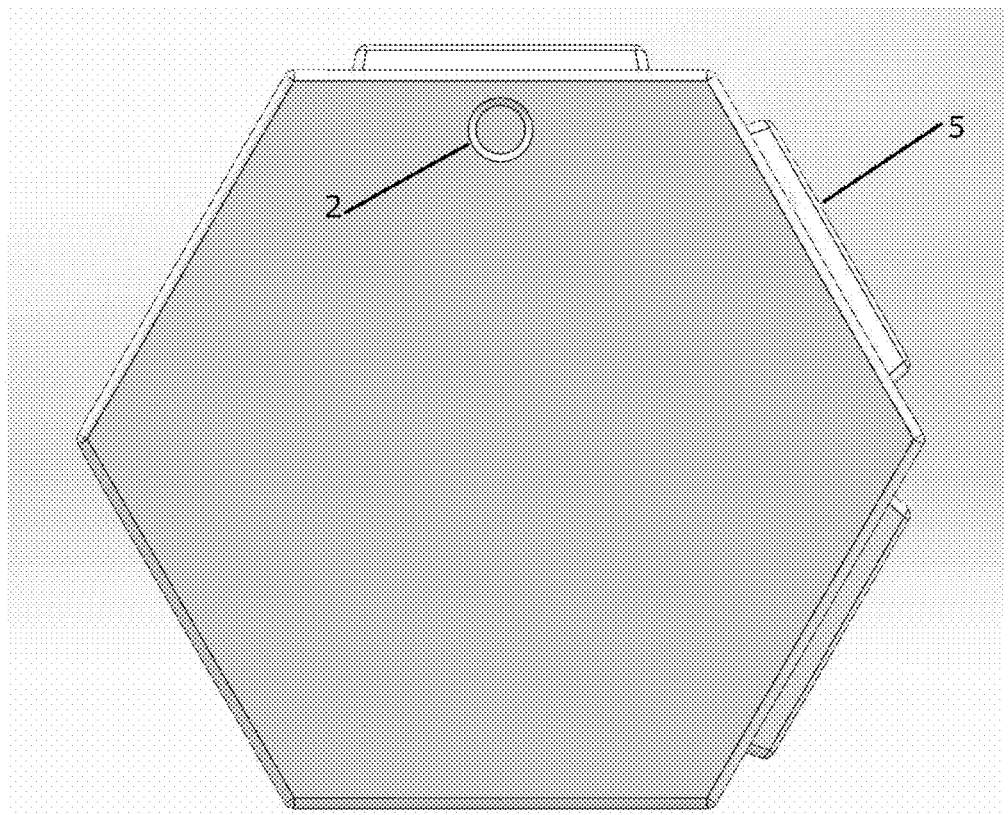
FIG. 2 is a front view of the outside/exterior face of a wall building panel unit.
Figure 3:
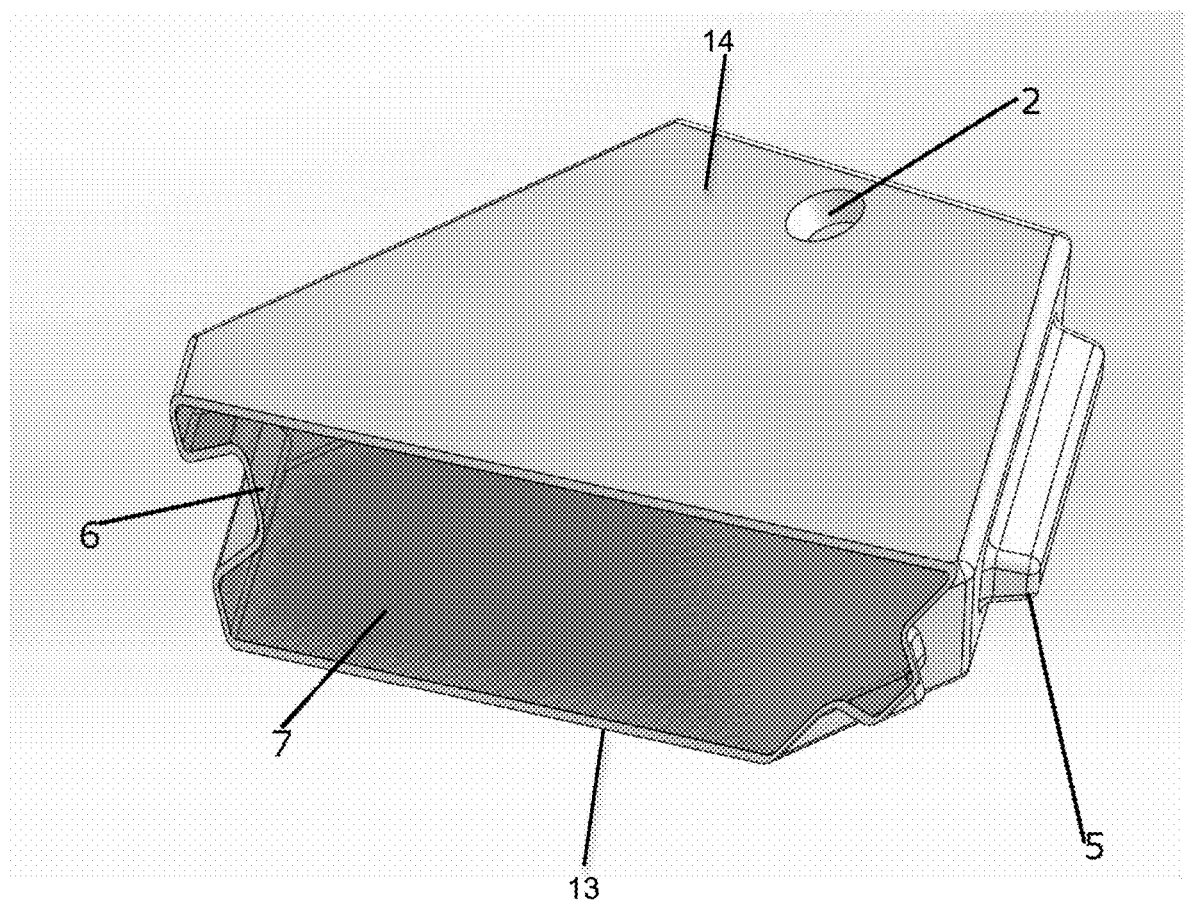
FIG. 3 is a cross-sectional view of a hexagonal panel taken along line III-III of FIG. 2.

As shown in FIG. 1, the tornado shelter dome comprises a set of interlocking hexagonal panels 1, (FIG. 2), pentagonal panels 3, and trapezoidal panels 4, that together form a dome shaped safety shelter. Each panel 1 is hollow, comprising a cavity 7 (FIG. 3) enclosed by interior and exterior/outer, panel portions 13 and 14, respectively, which are spaced apart in parallel relation and, has a bunghole type filler opening 2 in the exterior panel portion 14 adjacent a top through which the panel can be filled by pouring a flowable material such as a non-Newtonian fluid, liquid, gel, or granular substance for energy absorption and added weight. Once constructed, he dome measures approximately 4'7.5" tall and has a (base) diameter of approximately 8'1".

Figure 8:
FIG. 8 is a diagrammatic front view of a panel unit showing the impact distribution from a 2×4 piece of wood travelling at 250 mph.

The panels can be interlocked together manually by mating engagement of interlocking tongues 5 and grooves 6 forming transverse panel sides joining opposed edges of the interior and exterior panel portions together. A single, outward opening door 16 (FIGS. 4 and 8) has a frame provided with complementary tongues and groove for interlocking with those on the panels.

The door includes baffled ventilation holes to allow sufficient airflow and pressure stabilization. Affixed to the door periphery are multiple twist handles (not shown) that engage the frame and lock the door in place.

Figure 4:
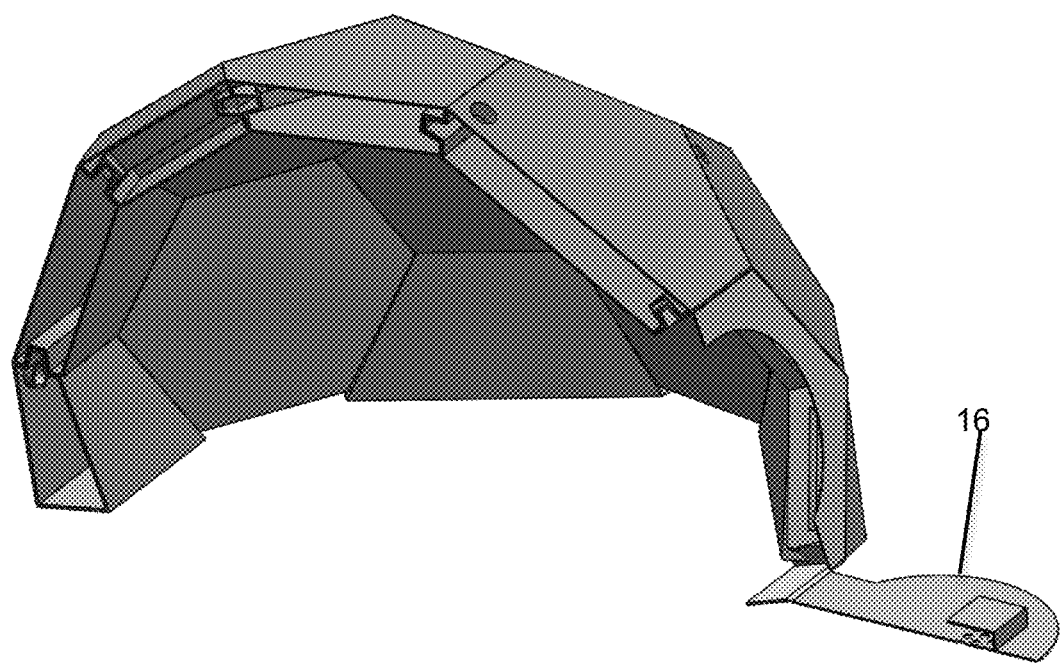
FIG. 4 is a cross sectional view of the shelter dome taken along line VI-VI of FIG. 6.

As shown in FIG. 4, the dome interior provides sitting room space 8 for 4-6 adults.

Figure 5:
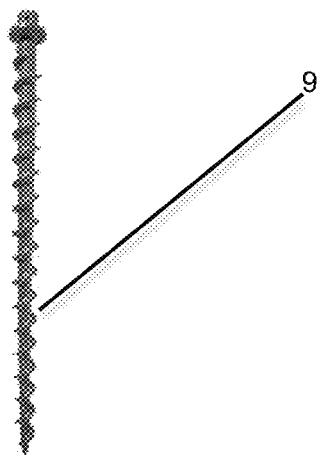
FIG. 5 is a perspective view of an example of one type of anchor.
Figure 6:
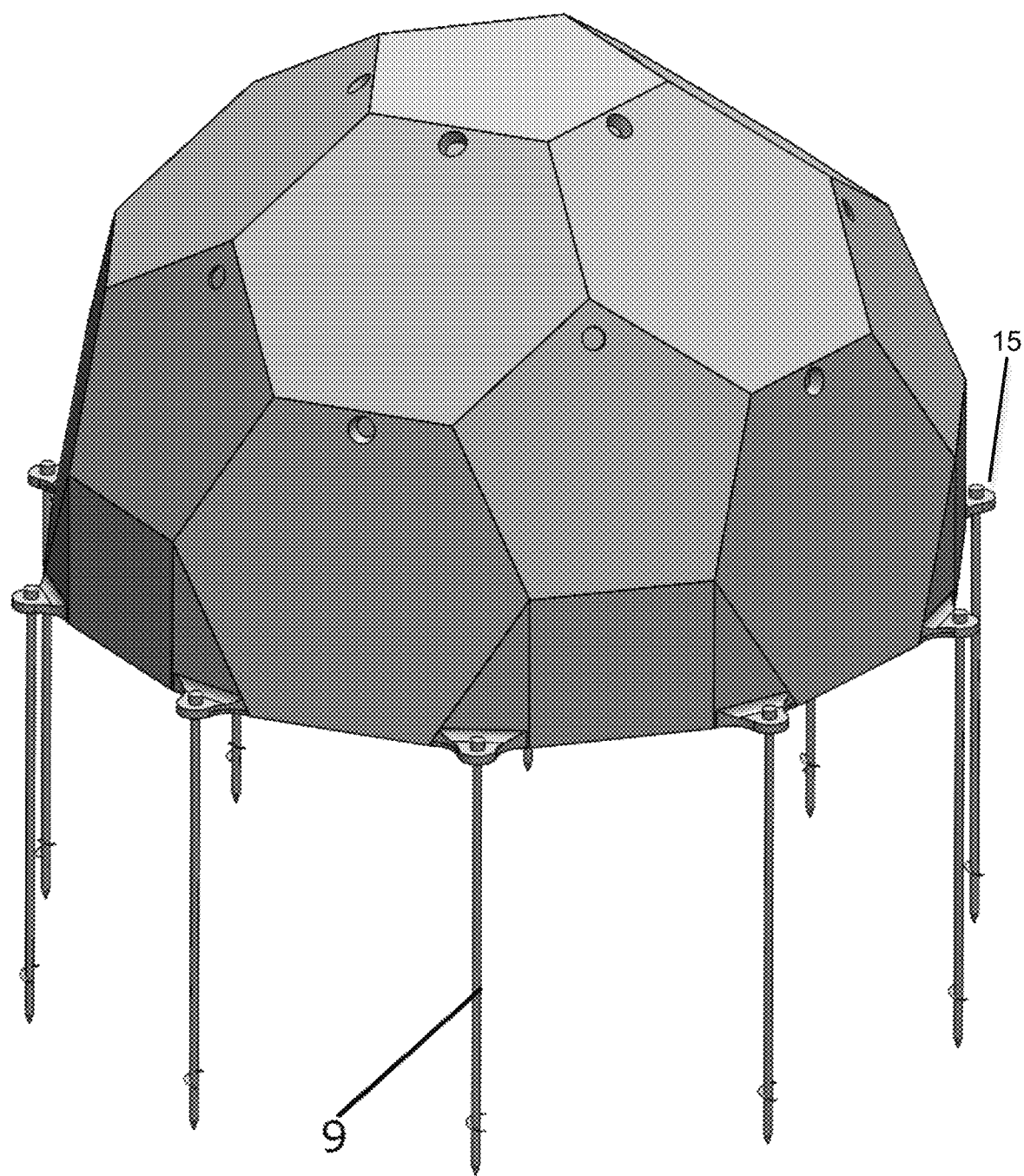
FIG. 6 is a schematic perspective view of one side of the tornado shelter dome showing the anchors mounted to extend below ground level (omitted)

FIG. 6 shows the erected dome with multiple anchor eyes 15 on ground/slab engaging panels receiving respective threaded screw/augur type anchoring stakes 9 (FIG. 5) that extend below ground level.

Figure 7:
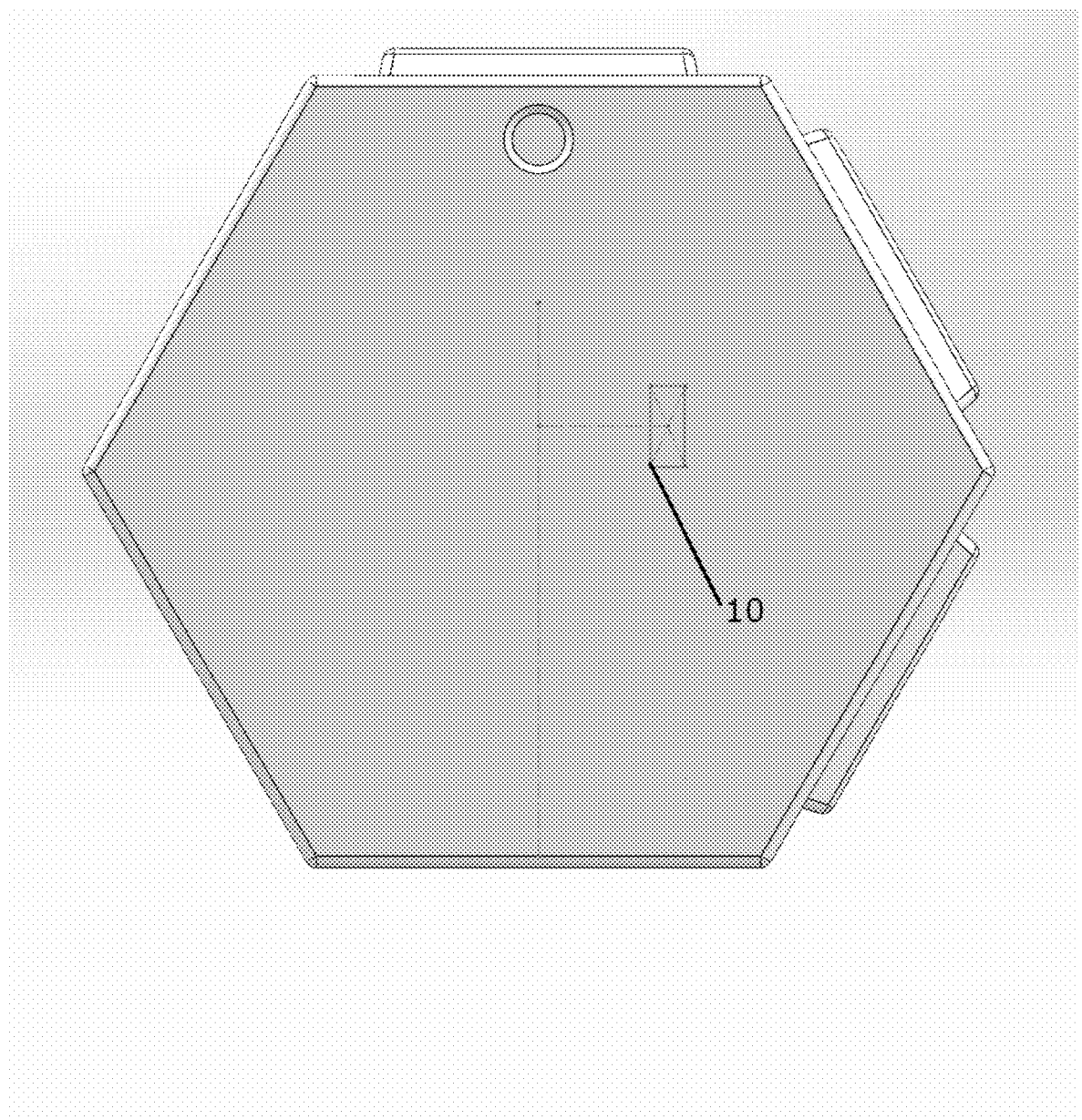
FIG. 7 is a side view showing the impact zone strain from a 2×4 piece of wood.
Figure 9:
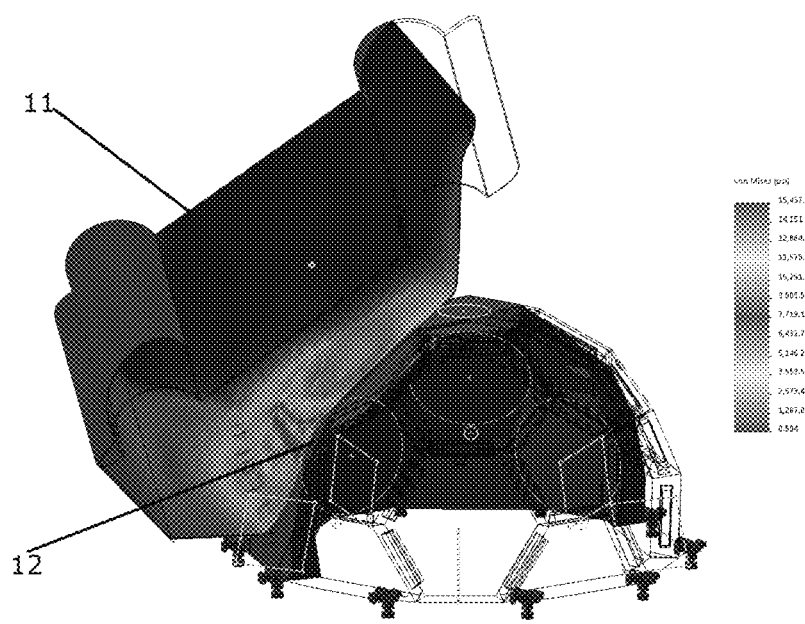
FIG. 9 is a diagrammatic view of a test rig showing the manner in which the dome will absorb the impact of a small, wind-blown truck.
Figure 10:
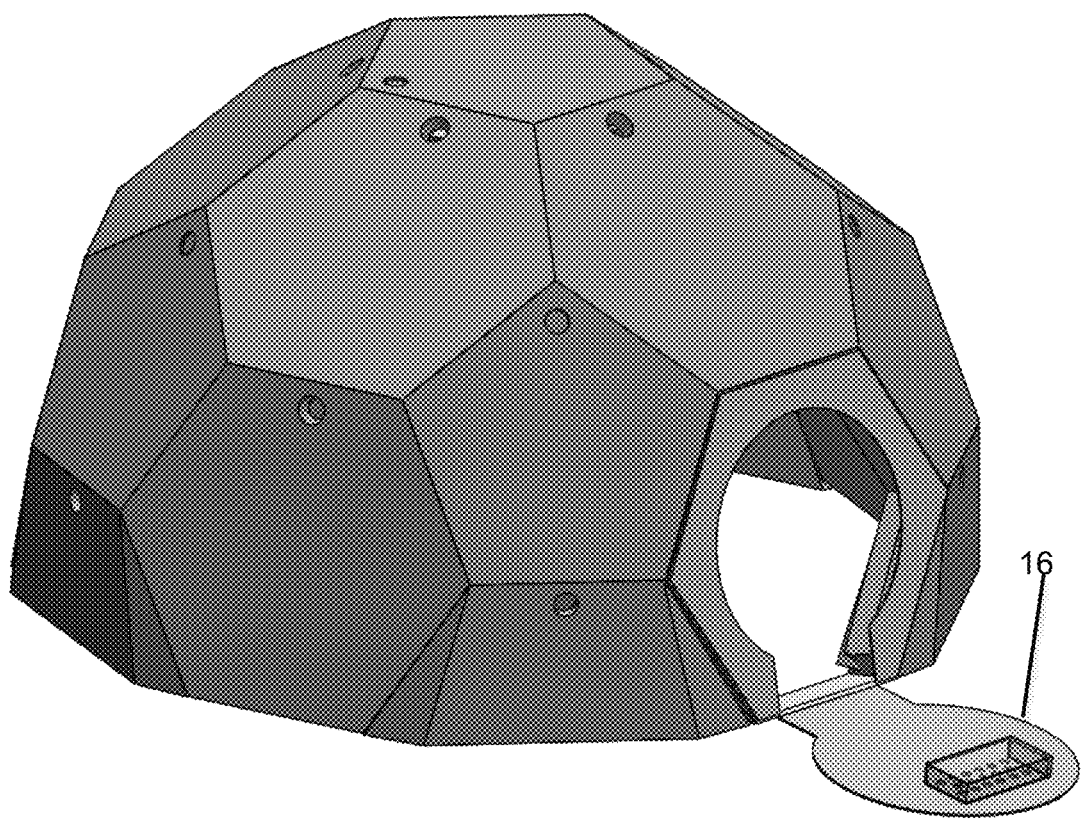
FIG. 10 is a fragmentary, perspective view of the front exterior of the dome showing an outward opening door.

FIG. 7 shows the 2×4 strike zone 10 on one of the hexagon panels 1 required by FEMA for testing. Another simulation, (FIG. 8), shows the simulated impact absorption of a 2×4 piece of wood striking one of the panels at a speed of 250 mph. FIG. 9 shows a truck 11 being tossed against the constructed dome and the redistribution of force that causes the truck to absorb most pressure at the impact point 12 and crumbling around the dome.

Figure 11:
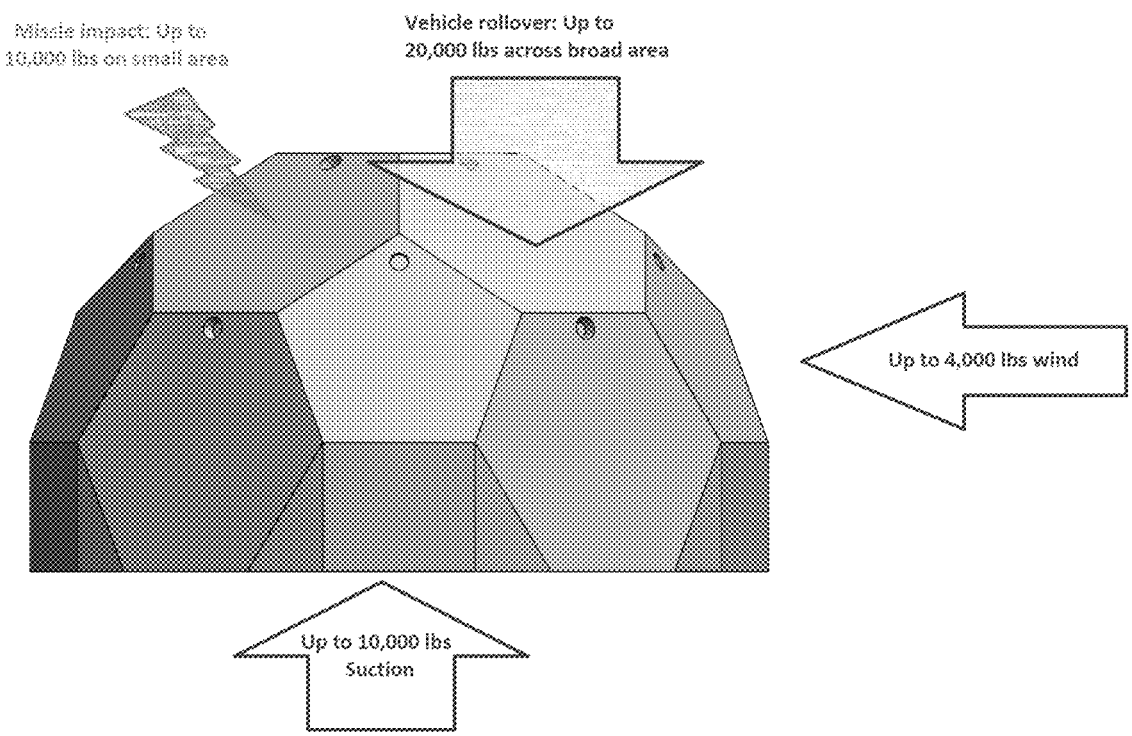
FIG. 11 is a schematic, perspective view of a side of the dome showing the calculated amounts and locations of simulated impact and absorption forces able to be withstood by the tornado shelter dome.
Figure 12:
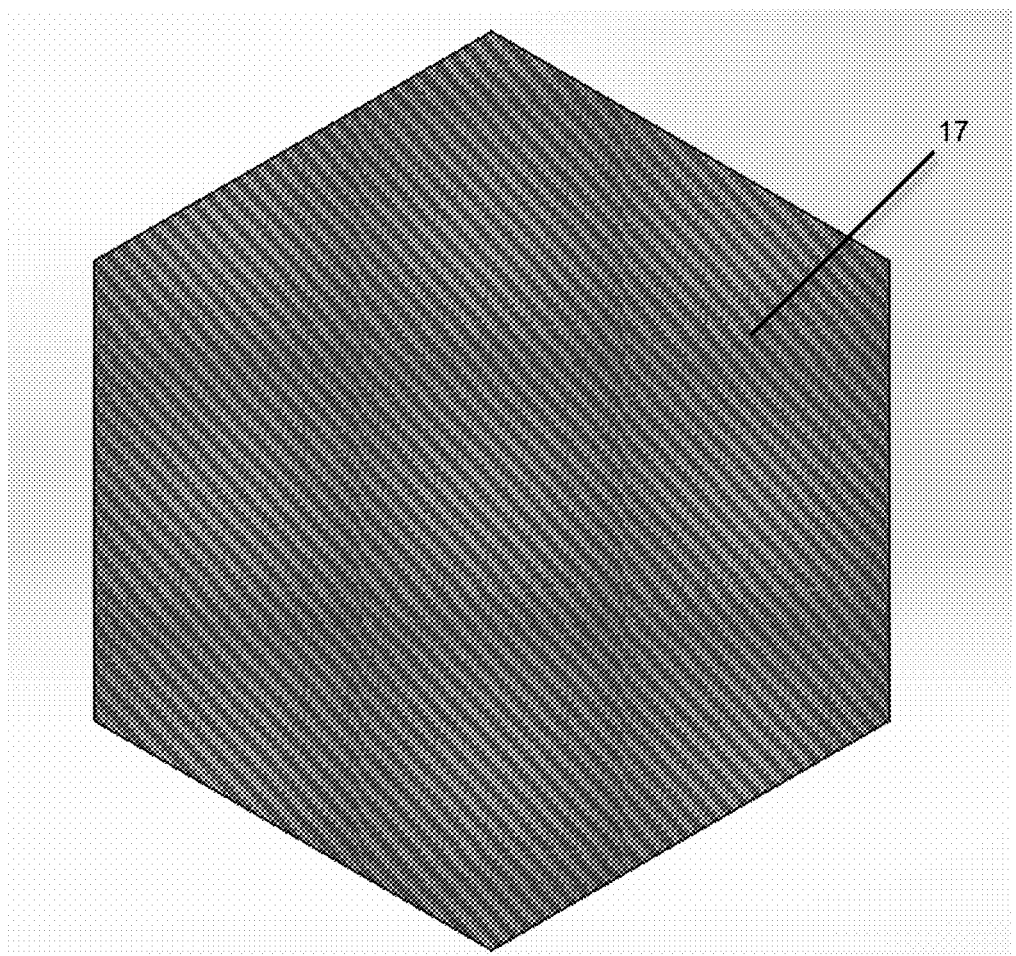
FIG. 12 is a schematic front view of an exterior face of a laminated outer panel portion showing KEVLAR reinforcement as the first, exposed, exterior/outside layer of lamination for impact resistance.

The tornado shelter dome is designed to withstand the multiple pressure and impact loads as indicated in FIG. 11. Simulations show that the dome can absorb windborne debris of up to 10,000 pounds as a small area impact and a large area impact, such as the rolling truck, of up to 20,000 pounds. The dome-shape enables the shelter to withstand tornado force side winds of up to 4,000 pounds total force. The stakes 9 are necessary for anchoring the dome to withstand up to 10,000 pounds of lift-off force.

As described above, there are many obstacles for the average consumer in acquiring a storm safety shelter such as weight of materials, installation by a third party, difficulty of movement, and expense of relocation. The tornado shelter dome of the invention offers solutions to all of those obstacles.

By using industry standard materials such as cross-linked polyethylene, and rotational molding manufacturing techniques, the main constituents of the invention will be inexpensive to manufacture. A molded material such as cross-linked polyethylene is impact and tear resistant. Combining with a liquid, gel, or granular substances results in an energy absorption system that is greater than steel. The molded plastic material does not deteriorate or require regular maintenance unlike steel structures that require ongoing maintenance (repainting) to prevent rust, and need to be repainted. The molded plastic material is be lightweight with the heaviest dome panel weighing approximately 28 pounds before filling material is added, and can be assembled by a single person.

After erecting the dome, the user stakes it to the ground at as many as 10 different points (FIG. 6), by using stakes such as American Earth Anchors model PE46, (FIG. 5). 10 stakes could provide up to 10 times the required holding force to secure the shelter to the ground in the case of an F3-4 tornado depending upon soil type. The user can reference a stake chart to determine the appropriate type and number of stakes for the ground type. Stakes can be driven into the ground either by a ratchet wrench, a lever handle, or an impact wrench powered either pneumatically or electrically. Alternatively the dome may be attached to a concrete pad with cast in place bolts or drilled-in bolts.

Once constructed and staked to the ground, the user will fill each panel through each bunghole 2 with a non-Newtonian fluid, liquid, gel, or granular substance to transform the hollow panels into high impact absorbing panels raising the weight of the shelter dome to approximately 2,000 pounds. The benefit of this design allows a single person to construct the dome while the panels are empty and then add the filler material. Some filler materials may require the customer to add a chemical mixture such as propylene glycol or glycerol with ph buffering compounds like potassium phosphate to prevent freezing and bacterial growth. The panels can be emptied with a transfer pump, and the dome can be easily disassembled for relocation. To provide additional waterproofing, a fitted cover made from nylon, canvas or other similar material may be attached over the dome. A capturing net may also be placed over the dome and anchored to the ground.

Figure 13:
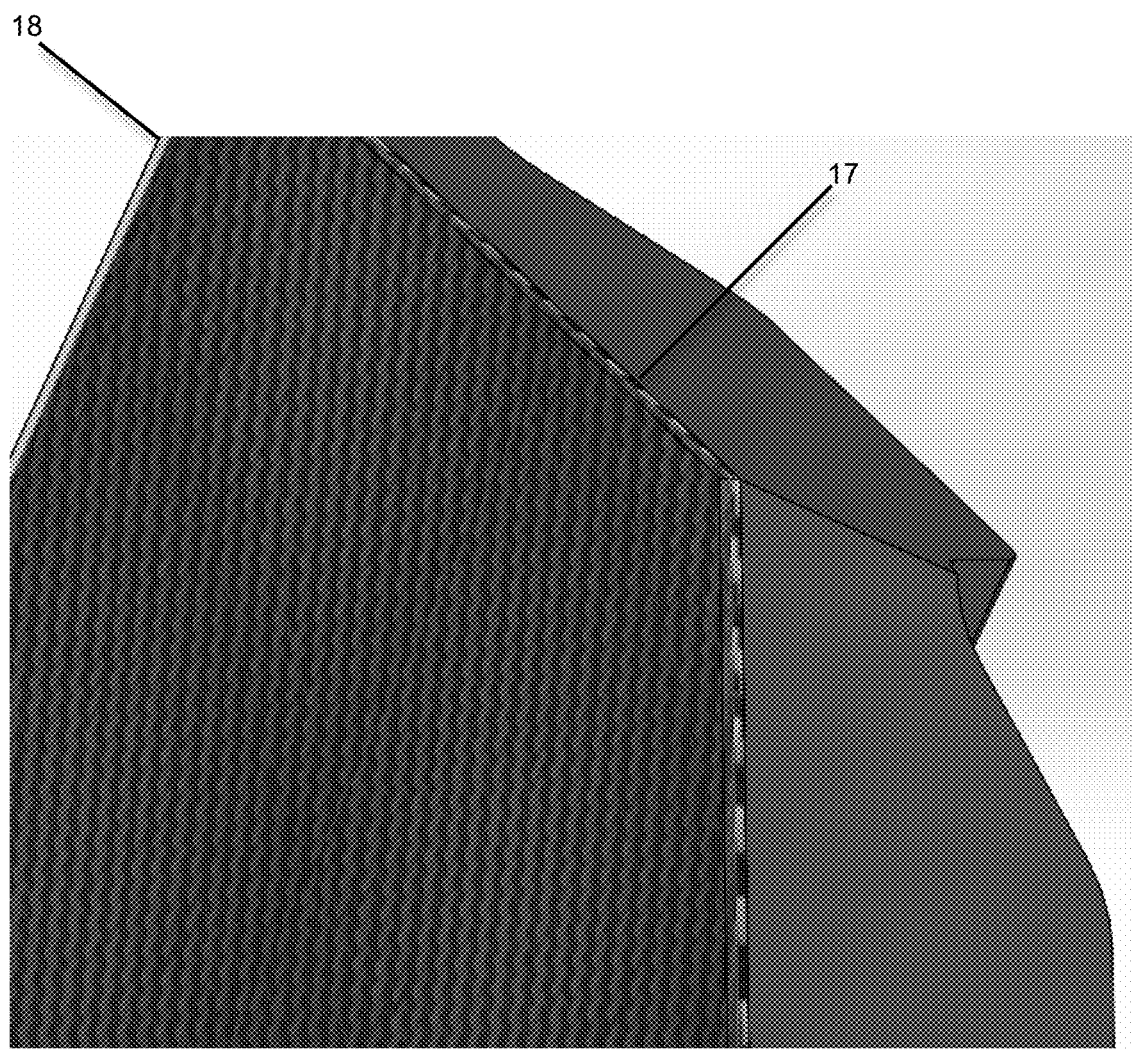
FIG. 13 is a schematic, fragmentary, cross-sectional view of an outer, laminated panel portion with a layer of KEVLAR reinforcement as an intermediate layer, an outer layer of PE and an inside layer (not seen) of polycarbonate.
Figure 14:
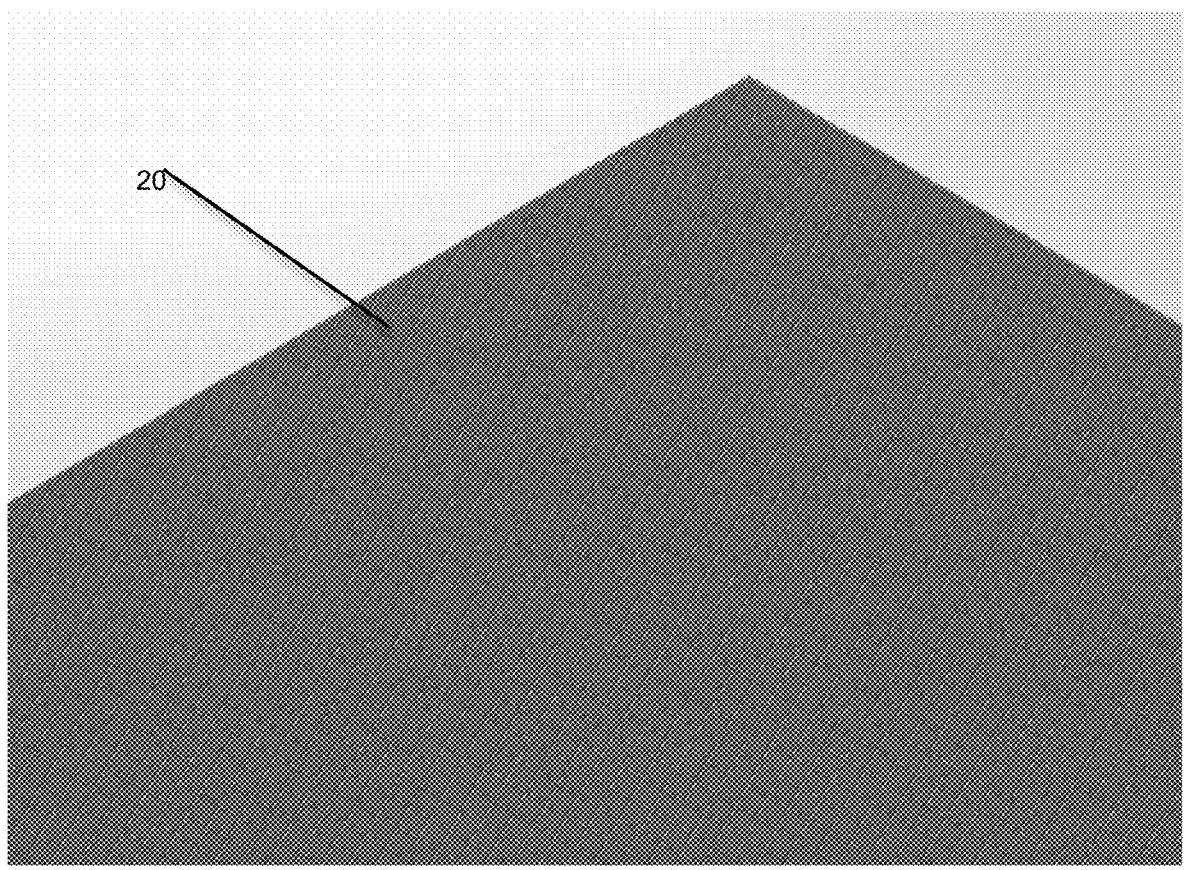
FIG. 14 is a schematic, fragmentary view of a corner of an exterior face of an outer, laminated panel portion showing a reinforcement of square mesh as the first, exterior layer of lamination.
Figure 15:
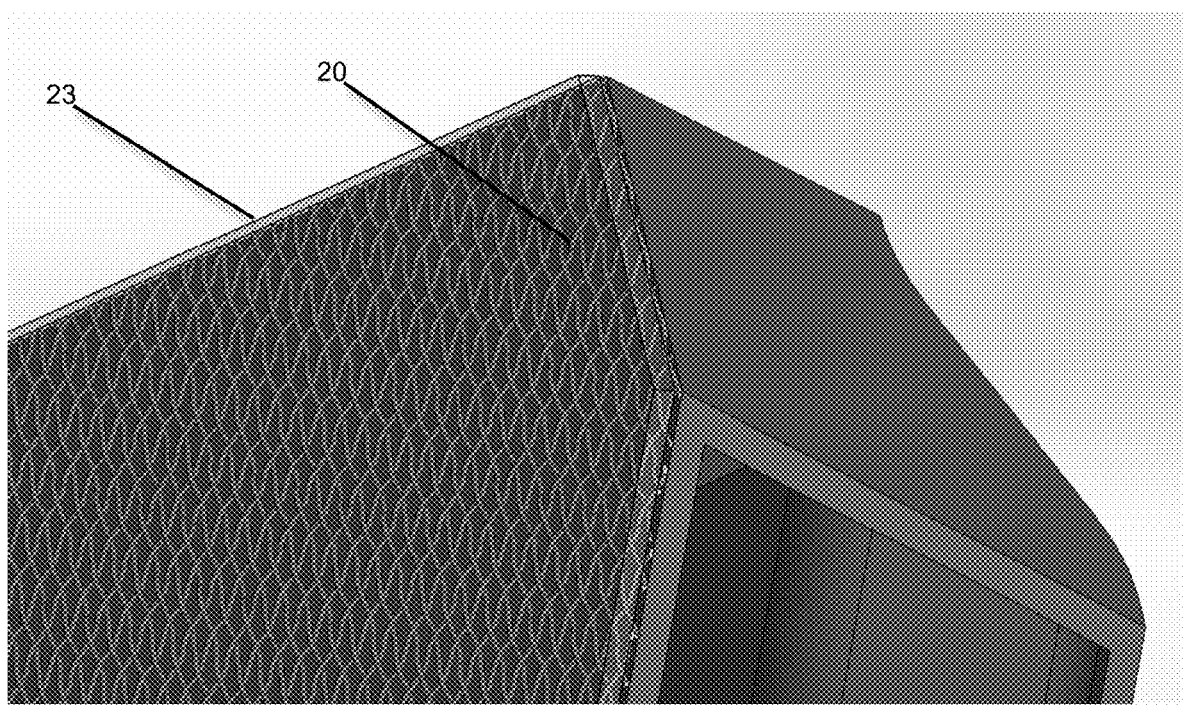
FIG. 15 is a schematic, fragmentary, cross-sectional view of a front corner of an outer panel portion with a reinforcement of square mesh as an intermediate layer of lamination.
Figure 16:
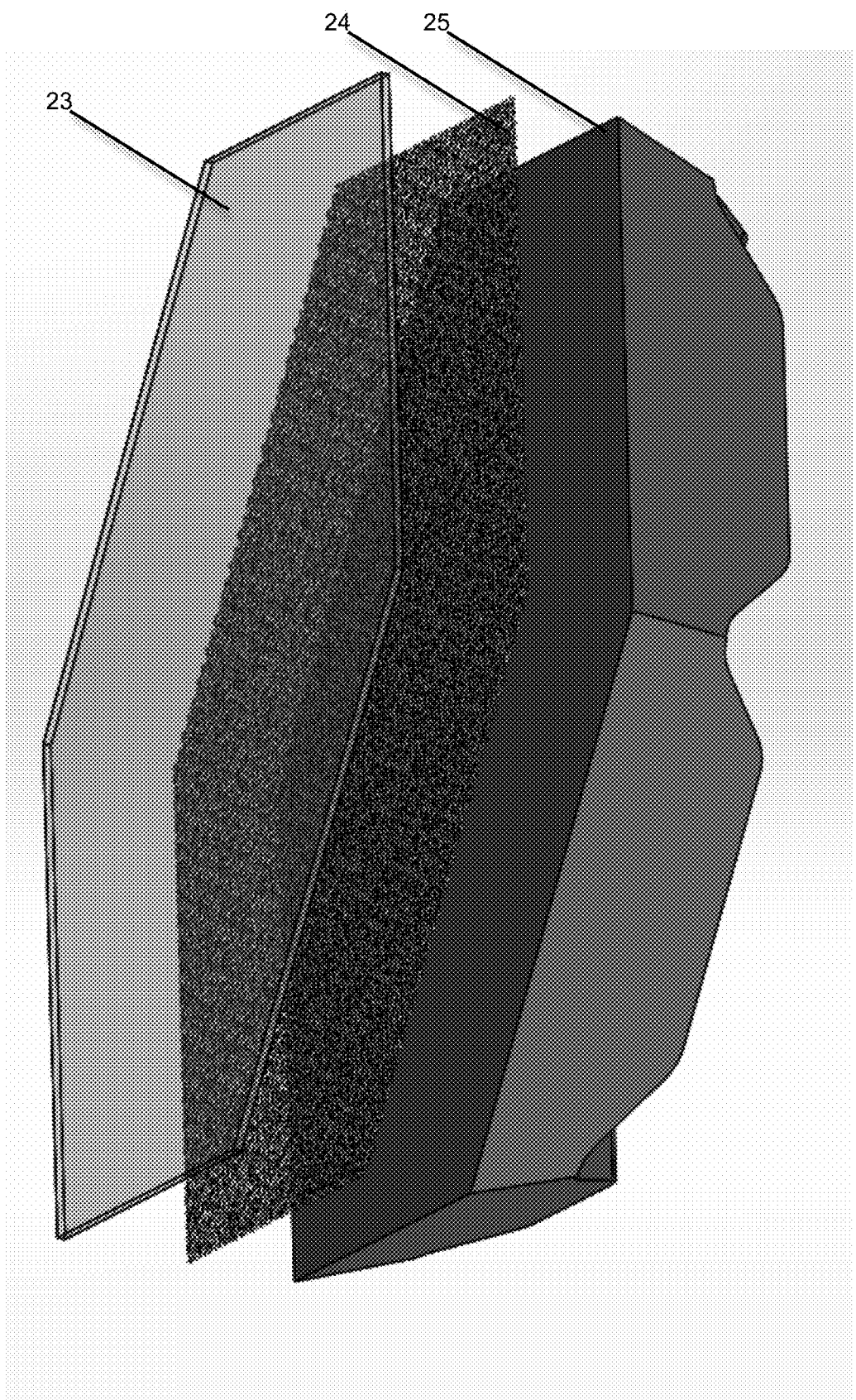
FIG. 16 is a diagrammatic, exploded view of a laminated front, exterior panel portion with a first exterior layer of polycarbonate, a second, intermediate layer of reinforcing material such as mesh and a third innermost layer of cross-linked PE.

FIG. 13 is a schematic, fragmentary, cross-sectional view of an outer, laminated panel portion with a layer 17 of KEVLAR reinforcement as an intermediate layer, an outer layer 18 of PE and an inside layer (not seen) of polycarbonate;

FIG. 14 is a schematic, fragmentary view of a corner of an exterior face of an outer, laminated panel portion showing a reinforcement of square mesh 20 as the first, exterior layer of lamination;

FIG. 15 is a schematic, fragmentary, cross-sectional view of a front corner of an outer panel portion with a reinforcement of square mesh 20 as an intermediate layer of lamination;

FIG. 16 is a diagrammatic, exploded view of a laminated front, exterior panel portion with a first exterior layer 23 of polycarbonate, a second, intermediate layer 24 of reinforcing material such as mesh and a third innermost layer 25 of cross-linked PE.

The invention claimed is:

1. A kit for making a ground standing tornado shelter wall comprising a set of a multiplicity of loose-piece, modular, single-piece, empty, shell-form, wall panel units, hollow throughout, for transportation to an erection site and pre-configured and self-supporting for manual assembly together by a single person at respective peripheral edges when empty to erect at the site, a hemi-spherical, dome-shape, free standing, ground supported, framework of a people sheltering, tornado shelter wall, the hollow, wall panel units each comprising an interior, sheet-form, panel portion and an exterior, sheet-form, panel portion connected together at each peripheral edge of the interior and exterior, sheet-form, panel portions, locating the interior, sheet-form, panel portion and the exterior, sheet-form, panel portion adjacent in spaced apart, face-to-face relation so as to define opposite, major upright walls of a cavity providing respective empty containers that can receive and retain pourable ballast therein, a filler opening formed in each exterior panel portion adjacent a top thereof that can receive a pourable, filling ballast material therein when all the panel units have been so assembled together, such that ballast weight is distributed over the entire framework of the tornado shelter wall when all containers are filled thereby increasing impact strength and ground anchoring weight.

2. The kit of claim 1 wherein said respective peripheral edges are elongate and integrally formed with respective, complementary, elongate, interlocking, male and female portions extending therealong to enable the assembly together of adjacent panel units in mating engagement by edge on edge, relative longitudinal sliding movement.

3. The kit of claim 2 wherein the male and female portions are undercut in complementary fashion to prevent unlocking separation except by relative longitudinal sliding movement.

4. The kit of claim 2 further comprising means on panel units for attaching anchoring stakes to the assembly.

5. The kit of claim 4 wherein said means comprise eyes formed on selected wall panel units which provide a base of the wall.

6. The kit of claim 2 wherein the exterior, sheet-form, panel portions of at least some of the panel units comprise laminates of KEVLAR and plastics including at least one layer of PE and a polycarbonate.

7. The kit of claim 2 wherein the exterior, sheet-form, panel portions of at least some of the panel units comprise laminates of metal mesh and plastics including at least one layer of PE and a polycarbonate.

8. The kit of claim 1 further comprising means on panel units to attach anchoring stakes to the assembly, wherein said means comprise eyes formed on selected wall panel units which provide a base of the wall.

9. The kit of claim 1 further comprising an access door for closing a gap between adjacent panel units when assembled together.

10. The kit of claim 9 wherein the access door includes an outer frame with complementary, interlocking, male and female portions for mating engagement with adjacent panel units to close the gap.

\* \* \* \* \*